3,354,003
SEMI-CONDUCTOR JUNCTION WITH A
DEPLETION LAYER
Arthur Langridge, William B. Glass, Henry William Grimwood, and Brian A. Hegarty, King's Cross, London, England, assignors to Westinghouse Brake and Signal Company Limited, London, England
Filed Oct. 14, 1963, Ser. No. 315,843
Claims priority, application Great Britain, Oct. 31, 1962, 41,189/62; Mar. 22, 1963, 11,420/63; Apr. 23, 1963, 15,945/63; July 31, 1963, 30,342/63
8 Claims. (Cl. 148—33)

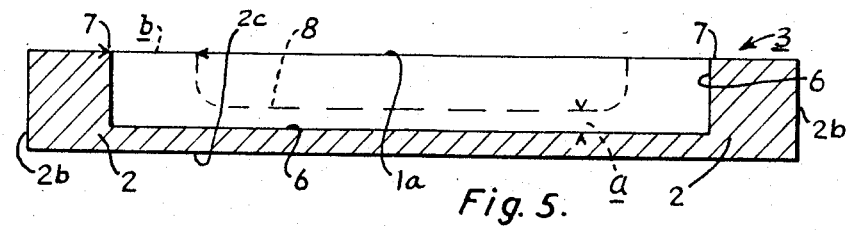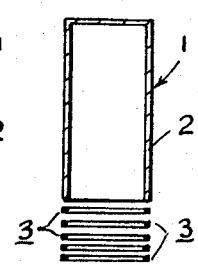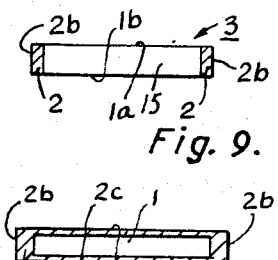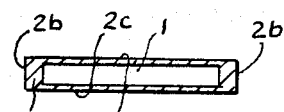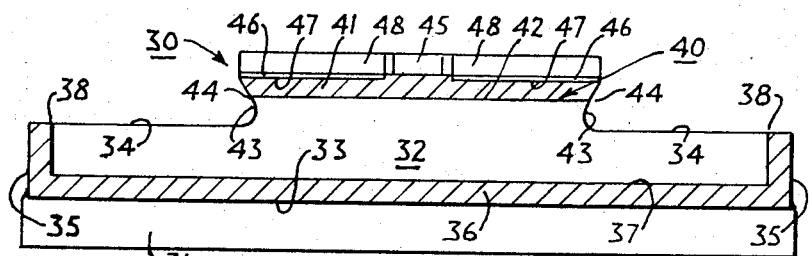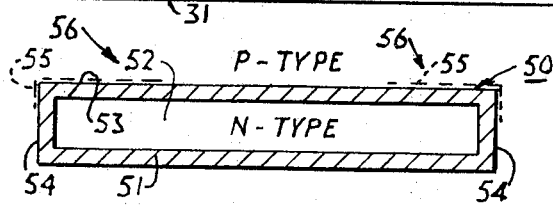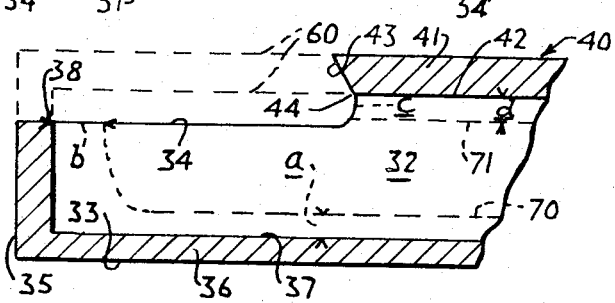

This invention relates to semi-conductor junction elements and to methods of their manufacture.

When an electrical potential is applied in the reverse direction across a semi-conductor element the voltage/current characteristic is somewhat as shown in the accompanying FIGURE 1. As can be seen from FIGURE 1, as the voltage applied increases the current passing through the element in the reverse direction is relatively small until the voltage reaches V1 when what is known as the "avalanche effect" occurs and the current passed considerably increases with a relatively small increase in voltage. However, except for specially designed semi-conductor elements, this theoretical situation never occurs for the reason that at some voltage less than V1, say V2, surface break-down occurs across the P-N junction across the periphery of the junction where it emerges on the surface of the element. As a result, the voltage/current relationship does not follow that of the theoretical full line shown in FIGURE 1 after the voltage V2 but follows the dotted line. This surface breakdown unlike the "avalanche effect" may be non-reversible and could destroy the properties of the element. As a result, with such an element the advantages of the "avalanche effect" cannot be achieved.

This problem has been recognized and attempts have been made by way of suitable physical design of the elements to minimize the possibility of breakdown on the surface before the avalanche effect is achieved. However, such a solution has limitations as to the type of element to which this solution can be applied.

There has been previously proposed a construction of semi-conductor elements in which, by virtue of the characteristics of the P- and N-type conductivity materials of the element, the surface breakdown voltage of the element in the region thereof adjacent the periphery of the P-N junction is in excess of the avalanche voltage of the P-N junctions in the interior of the element. In the specific examples previously proposed, the necessary characteristics are achieved by making the material adjacent the surface of the element in the region thereof adjacent the periphery of the P-N junction effectively more intrinsic than one of the materials forming the part of the P-N junction in the interior of the element. The effect of this is that, in such a construction, the depletion layer extends over a greater distance at the periphery of the junction than it does at the interior region of the junction with the result that reversible breakdown will occur in the element by virtue of the "avalanche effect" occurring in the interior of the element before surface breakdown occurs at the periphery of the junction.

The present invention seeks to achieve the same end result (i.e. the protection of the element against surface breakdown) also by securing extension of the depletion layer at the periphery of the junction.

The present invention accordingly provides a semi-conductor junction element comprising a slice of semi-conductor substance having opposed faces and a peripheral face extending therebetween, the slice having a first region of one type of conductivity and of high resistivity and a second region of the opposite type of conductivity and of low resistivity providing between them a P-N junction which has a first mid-portion adjacent one of the opposed faces of the slice and a second portion located adjacent the other of the opposed faces of the slice, at least that part of the second region adjacent said second portion of the P-N junction having been formed by the diffusion into the slice of material to induce in said part the characteristics of said second region, and the P-N junction being arranged such that the distance which the depletion layer in the first region extends over the surface of the slice is greater than the depth which the depletion layer has where it is adjacent the mid-portion of the junction.

The periphery of the P-N junction may be located on either said other of the opposed faces or on the peripheral face of the slice. In either case, the second portion of the junction may extend inwardly of the slice from the peripheral face and lie in close proximity to said other of the opposed faces of the slice. By the term "close proximity" is to be understood that the distance between that portion of the P-N junction in respect of which the term is used and said other of the opposed faces is less than the thickness which the depletion layer would have adjacent that portion if it were not closer to that other of the opposed faces than that thickness.

Alternatively, when the periphery of the junction lies on said other of the opposed faces the second portion of the junction may extend from the periphery of the junction and inwardly of the slice from said other of the opposed faces. The second region may also, in this event, be constituted by a shell region which extends over said one of the opposed faces and the peripheral face of the slice and the whole of this shell region may have been formed by the diffusion into the slice of material to form said opposite type of conductivity. Alternatively, that portion of the shell region adjacent the mid-portion of the junction may have been formed by alloying into said one of the opposed faces material to induce in this portion the characteristics of said second region.

Where such a shell region is provided, it may extend also over a peripheral portion of said other of said opposed faces such that said second portion of the P-N junction extends parallel to said other of the opposed faces and partly overlies the said first portion of the P-N junction adjacent said one of the opposed faces before emitting at its periphery on said other of the opposed faces.

In an alternative construction and where a shell region is provided, it may be disposed adjacent the junction of the peripheral face and said one of the opposed faces with a thickened portion which provides said second portion of the P-N junction.

An element having a shell region may have been formed by, in a lamina having opposed faces and of semi-conductor substance of one type of conductivity and of high resistivity, forming a totally-enclosing shell region of the opposite type of conductivity and of low resistivity, and by removing material from one of the opposed faces of the lamina (which constitutes in the element said other of the opposed faces of the slice) to a depth sufficient to expose on that face the P-N junction, the thus exposed part of the junction forming the periphery thereof. In this case, material may have been removed from the lamina over the whole of said one of the opposed faces of the lamina which constitutes in the element said other of the opposed faces of the slice. Alternatively, material may have been removed from the lamina over only a portion of said one of the opposed faces of the lamina which constitutes in the element said other of the opposed faces of the slice. In this latter event, material may have been removed from the lamina over only the peripheral portion of said one of the opposed faces of the lamina (which constitutes in the element said other of the opposed faces of the slice) thus providing in the resultant slice a central projecting portion on said other of the opposed faces of the slice within which there is provided a further P-N junction. There may be provided in said central portion an additional P-N junction, and, in any case, the peripheral face of the central portion may be undercut.

Except where the periphery of the P-N junction is on the peripheral face of the slice, the element may be manufactured by a method including the steps of diffusing into a crystal of semi-conductor substance of one type of conductivity and of high resistivity, a material to form in the crystal a totally-enclosing surface layer of the opposite type of conductivity and of low resistivity, thereafter dividing the crystal transversely into sections each having opposed faces between which extends a peripheral face extending inwardly of the section from which is a portion having said opposite type of conductivity, and subsequently treating each section to form an element. The crystal may be pre-shaped to a required configuration, for example, to a cylindrical form. The subsequent treatment may comprise diffusing into one of the opposed faces material to form adjacent that face a further portion having said opposite type of conductivity which with the previously formed portion provides said shell region or it may comprise alloying into one of the opposed faces material to form adjacent that face a further portion of said opposite type of conductivity which, with the previously formed portion, provides said shell region. Each section (which constitutes the lamina above mentioned over the whole of the surface thereof), may have diffused into it material to form said totally-enclosing shell region, which is subsequently removed from the whole of one of the opposed faces of the section or from only a portion (which may be the peripheral portion) of one of the opposed faces of the section. The material may be removed by grinding or with etchant. There may subsequently be formed in the central portion an additional P-N junction and, in any case, the peripheral face of the central portion of said one of the opposed faces may be undercut by directing a jet of etchant at said peripheral face of the central portion.

For the manufacture of an element in which the shell region extends over a peripheral portion of said other of the opposed faces of the slice as above described, the method may include subsequently diffusing into the other opposed faces of each section over the peripheral portion thereof material to form adjacent said peripheral portion an additional portion of said opposite type conductivity which with said previously formed portion and said further portion provides said shell region. Alternatively such an element may be manufactured by a method including the steps of, on a slice of said semi-conductor material, masking the central portion of said other of the opposed faces of the slice and diffusing into the slice over the whole of the unmasked portion thereof material to form in said slice said shell region.

For the manufacture of an element having in its shell region a thickened portion as above described, the method may include, after forming a shell region by any of the methods above described, subsequently diffusing into said one of the opposed faces of each section over the peripheral portion thereof material to form said thickened portion of the P-N junction.

For the manufacture of an element where the periphery of the P-N junction lies on the peripheral face of the slice, as above described, the method may include the steps of forming in a slice of semi-conductor substance having opposed faces and a peripheral face extending therebetween and of one type of conductivity and of high resistivity, a first portion of the opposite type of conductivity and of low resistivity which extends into the slice over the whole of one of the opposed faces thereof and subsequently diffusing into the slice material to form an annular portion adjacent the periphery of the slice and extending into the slice from said one face to a depth such that said second portion of the P-N junction provided by said annular portion lies in close proximity to the other of the opposed faces. Said first portion of the opposite type of conductivity may be formed by diffusing or alloying into the slice material to induce in the slice the characteristics of said first portion of the opposite type of conductivity.

Embodiments of the present invention will now be described in greater detail, by way of example only, with reference to FIGS. 2 to 18 of the accompanying drawings of which:

FIG. 5 shows a cross-sectional view of an alternative single-junction element;

FIGS. 6–10 show various steps (on a reduced scale) in one method of manufacture of the element of FIG. 5;

FIG. 11 shows a multi-junction element;

FIG. 12 shows one stage in the manufacture of the element of FIG. 11, and

FIG. 13 shows a further stage (on an enlarged scale) in the manufacture of the element of FIG. 11;

Figure 14:
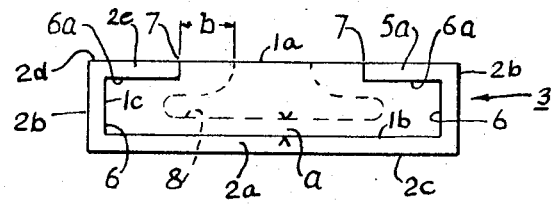
FIG. 14 shows a cross sectional view of another embodiment of the invention.
Figure 15:
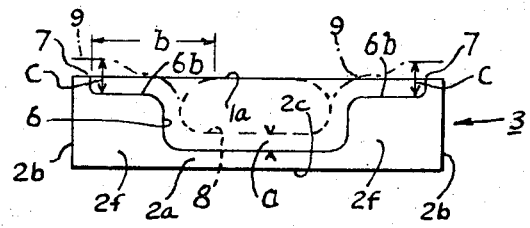
FIG. 15 shows a cross section view of a further embodiment of the invention.
Figure 16A:
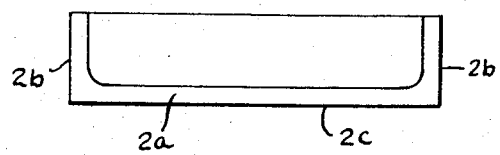
Figure 16B:
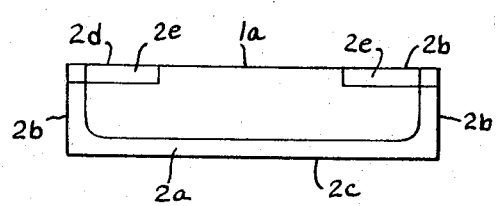
Figure 17A:
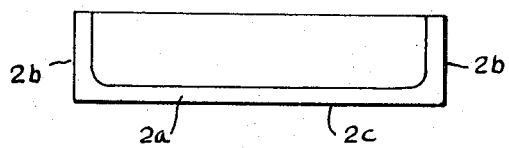
Figure 17B:
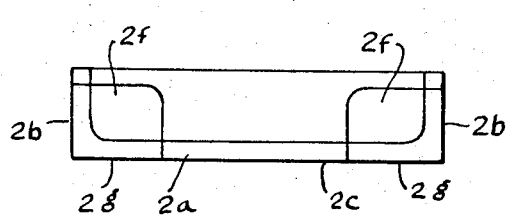

FIGS. 16(a) and (b) illustrate one method of manufacturing the element of FIG. 14, and FIGS. 17(a) and (b) illustrate one method of manufacturing the element of FIG. 15.

Figure 1:
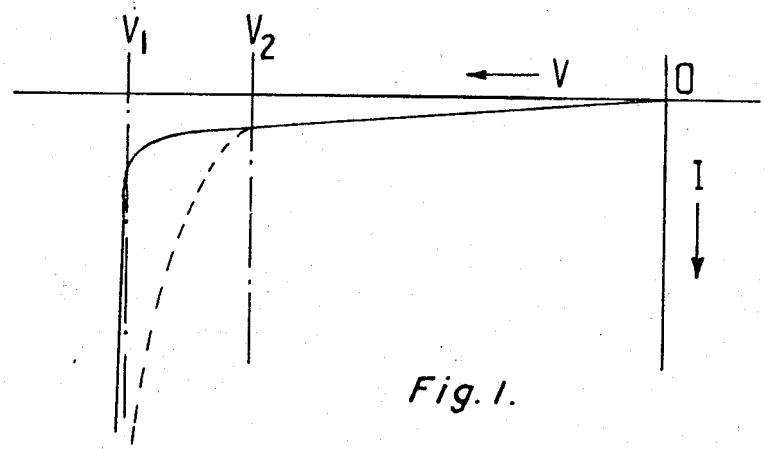
Figure 18:
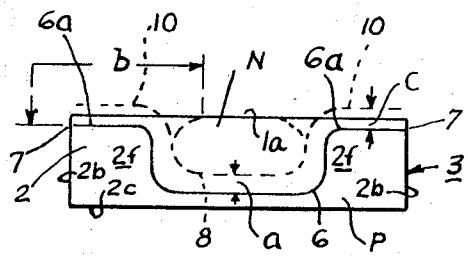

FIG. 18 shows a cross-sectional view of yet another embodiment.

Figure 2:
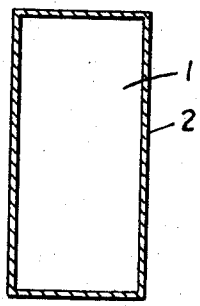
FIGS. 2, 3 and 4 show various steps in the process of manufacturing a semi-conductor single junction element.
Figure 3:
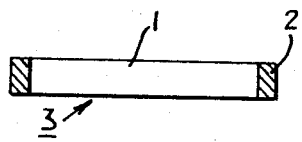
Figure 4:
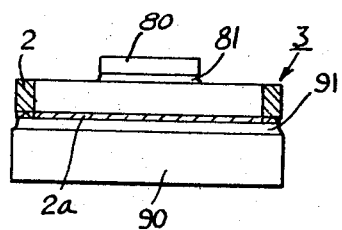

Referring, firstly, to FIGS. 2–4 of the drawings, a length of silicon crystal of semi-conductor material of N-type of conductivity and of high resistivity, is pre-shaped by centerless grinding to provide a cylindrical crystal 1 (FIG. 2) of the diameter required for the silicon slice to be used in the manufacture of a semi-conductor junction element.

After pre-shaping the crystal in this manner, an acceptor impurity, such as gallium is diffused into the crystal to a depth of approximately 0.004 inch to form with the silicon a totally-enclosing surface layer 2 of material of p-type conductivity and of lower resistivity.

The diffused crystal is then divided transversely of its longitudinal axis to provide sections 3 (FIG. 3) of circular shape which have opposed faces between which extends a peripheral face. The p-type material in each section forms a portion 2b which extends inwardly of the section from the peripheral face thereof.

The section 3 thus formed is assembled in a sandwich together with a molybdenum disc 90 (FIG. 4) a disc 91 of an aluminium silicon alloy, a disc 81 of gold alloy and a tungsten contact 80. The sandwich is then heated so that the gold alloy 81 solders the tungsten disc 80 to the silicon disc 3 and the aluminium silicon alloy fuses to the molybdenum disc 90. In addition, the aluminium silicon alloy itself alloys with the silicon disc 3 so as to form the silicon disc 3 into a semi-conductor junction element over the face of which a portion 2a of p-type conductivity is contiguous with the previously formed peripheral portion 2b thus providing a shell region of p-type conductivity; the periphery of the P-N junction thus formed lying on the one of the opposed faces of the element.

Referring now to FIG. 5 of the drawings, this element comprises a slice 3 of N-type high resistivity semi-conductor substance having opposed faces 1a and 2c between which extends a peripheral face 4. Extending over the face 2c of the opposed faces and the peripheral face 2b is a shell region 2 which has been treated to provide a region of P-type conductivity and of low resistivity, which provides between it and the inner N-type region a P-N junction 6, the periphery 7 of which lies on the other face 1a of the opposed faces of the slice 3.

The configuration of the limit of the depletion layer in the element is shown by the dotted line 8. It will be seen that the depth of depletion layer $a$ in the region of the junction 6 adjacent the face 2c is appreciably less than the extent of the depletion layer $b$ adjacent the periphery 7 of the junction 6. As can be seen in this figure as well as the subsequent figures, $b$ is the distance along the surface of crystal 3 measured between the limit of the depletion layer 8 and the periphery 7 of the junction 6. As a result, in the operation of the device the avalanche voltage across the first mid-portion of the junction will be less than the break-down voltage across the junction at its peripheral second portion, hence avalanche breakdown occurs in the bulk of the device before the critical break-down voltage of the junction is reached at the surface.

One method of manufacture of the element shown in FIG. 5 will now be described with reference to FIGS. 6-10.

A crystal 10 of a first N-type high resistivity silicon substance is grown and is centerless ground to the diameter of the required silicon slice for use in the element (FIG. 6).

After pre-shaping the crystal in this manner, a second substance, for example gallium, is diffused into the crystal to form in the crystal 1 a shell 2 of P-type low-resistivity conductivity (FIG. 7).

The crystal is then divided transversely into lamina or slice 3 (FIG. 8) such that each lamina has the configuration shown in FIG. 9. That is to say, each lamina 3 has opposed planar faces 1a and 1b between which extends a peripheral face 2b, and extending inwardly of the lamina 3 from the peripheral face 2b is a region 2 of P-type conductivity encircling an inner region 1 of N-type conductivity.

The lamina 3 thus formed is then subjected to further diffusion over all its surface by an acceptor substance which induces in the N-type silicon a P-type conductivity of low resistivity.

Advantageously, the two diffusion processes (that into the crystal 1 and that, subsequently, into the lamina or slice 3) are so controlled that the impurity gradient achieved by the diffusion into the lamina 3 is greater than that achieved by the diffusion into the crystal 1. By suitably controlling these diffusion processes to achieve the desired impurity concentration, the surface break-down voltage at the periphery 7 (FIG. 5) of the junction 6 in the finished element can be ensured to be greater than the avalanche voltage for the element.

After the diffusion into the lamina 3 in the manner above described, the lamina 3 will have a configuration as shown in FIG. 10 in which it has a shell portion 2 of P-type conductivity totally enclosing an inner region 1 of N-type conductivity.

The material over the whole of the face 1a is then removed (by grinding or etching) to a depth sufficient to remove completely that part of the shell portion extending over the face 1a thus providing a slice having a shell region 2 (FIG. 5) of P-type conductivity extending over the faces opposite faces 2b and 2c.

It will be appreciated that the element provided by the slice 3 is subsequently mounted by its face 2c on a base contact, in the usual manner and that, again in the normal manner, a cathode contact is mounted on the face 1a. This latter contact must, of course, be of lesser diameter than the limit 8 of the depletion layer at that face.

There is shown in FIG. 11 a multi-junction element constructed in accordance with the present invention. This element 30 is shown soldered on its base contact 31; and comprises a slice 32 of N-type high resistivity semiconductor substance having opposed faces 33 and 34 between which extends a peripheral face 35. Extending over the face 33 of the opposed faces and the peripheral face 35 is a shell region 36 which has been treated to provide between it and the inner N-type region a P-N junction 37 the periphery 38 of which lies on the annular face 34 of the opposed faces of the slice 32.

The slice 32 has a projecting central portion 40 integral with which there is a layer 41 of P-type conductivity which, with the N-type region of the slice 32 forms a further P-N junction 42. The peripheral face 43 of the central portion 40 is undercut (as shown) so that at periphery 44 of the junction 42 the peripheral face 43 is inclined with respect to the plane of the junction 42 in a direction to increase the depth of the depletion layer at the junction 42.

Secured to the center of the central portion 40 is an ohmic contact 45 providing a gate contact of the resultant device.

Surrounding the gate contact 45 and spaced therefrom is an annular layer 46 of semi-conductor substance which forms a layer of N-type conductivity which, together with the layer of P-type conductivity immediately below it, provides an additional P-N junction 47. To the layer 46 is secured an additional annular ohmic contact 48 providing a cathode contact of the resultant device.

The method of manufacture of the element 30 of FIG. 11 will now be described with reference to FIGS. 12 and 13.

A lamina of N-type conductivity high resistivity semi-conductor substance of the overall configuration of the lamina 50 is first formed. The lamina may be formed by cutting transversely a crystal prepared in the known manner or it may have been formed by any suitable alternative method.

The lamina 50 has then diffused into it a second substance which forms in the said lamina a shell region 51 of P-type conductivity and of low resistivity which extends over all the faces of the lamina 50 so as totally to enclose a residual inner region 52 of N-type conductivity.

The lamina 50 is then coated with an etch resistant wax and the coating removed over an annular area extending inwardly from the edge of the top face 53 of the lamina 50 and over part of the length of the peripheral face 54 extending downwardly from the top face 53 that is over the area indicated by the dotted line 55 in FIG. 12.

Etchant is now directed on to the lamina 50 in the direction of arrows 56 whilst the slice is rotated. The wax-covered area of the lamina is protected from the etchant but the area, indicated by the dotted line 55 in FIG. 12 is not so protected so that material is removed from the unprotected part of the top surface 53 by the etchant. This treatment is continued until material has been removed to a depth greater than the depth to which diffusion has occurred and the P-N junction formed by the diffusion is exposed.

By the above treatment, there is formed the slice 32 (FIG. 13—in which the configuration of the original lamina 50 is shown by the chain lines 60).

Comparing the slice thus formed with the slice 32 shown in FIG. 11, it can be seen that certain parts of the element 30 are already provided, the reference used in FIG. 9 indicating the equivalent parts shown in FIG. 11.

It thus now remains merely to provide the remainder of the construction of FIG. 11 in accordance with known techniques.

It is to be noted that by the etching process above described, not only is the necessary material removed but, simultaneously the central portion 40 is undercut in the described manner. However, if desired, the material to be removed from the top face 53 of the slice 50 may be removed by grinding, the residual central portion subsequently being undercut by any suitable means, for example, by directing a jet of etchant at the peripheral face 43 of the portion 40 whilst the slice 32 is rotated.

The configuration of the limit of the depletion layer in the element of FIGS. 11 and 13, is shown by the dotted lines 70 and 71 in FIG. 13. It will be seen that the extent of depletion $a$ in the region of the junction 37 adjacent the face 33 is appreciably less than the extent of depletion $b$ adjacent the periphery 38 of the junction 37. Consequently, in operation of the device, the field across the second peripheral portion of the junction 37 at the surface 38 will be less than the field across the first midportion of the junction 37 in the bulk of the slice 32 hence avalanche break-down occurs in the bulk before the critical voltage of the junction is reached at the surface.

Likewise, by the undercutting 43, the depth of the depletion layer $c$ adjacent the periphery 44 of the junction 42 is greater than the depth of the depletion $d$ adjacent the interior of the junction 42 with a similar result.

In the embodiments described above, the depletion layer at the periphery of the junction is caused to extend over a greater distance than it otherwise would, and more than it does in the interior of the element by virtue of the periphery of the P-N junction being located on one of the opposed faces of the element.

There will now be described arrangements in which the depletion layer at the periphery of the junction extends over an even greater distance (thus increasing even further the surface break-down voltage) by restricting still further the volume into which the depletion layer can expand adjacent the periphery of the junction.

This may be achieved in either one of two ways. Either by providing that the shell region extends over a peripheral portion of said other of the opposed faces thus causing the P-N junction to extend parallel to said other of the opposed faces and to overlie the portion of the P-N junction extending parallel with and adjacent to said one of the opposed faces, before emitting at its periphery on said other of the opposed faces; or, alternatively, by providing a thickened portion of the shell region adjacent the junction of the peripheral face and said one of the opposed faces such that that portion of the P-N junction where the junction lies adjacent the peripheral face of the slice and before it emits on said other of the opposed faces, extends inwardly of the slice from the peripheral face thereof in close proximity to said other of the opposed faces.

Embodiments of these alternative constructions will now be described with reference to FIGS. 14 to 17 of the accompanying drawings.

In both of the constructions of FIG. 14 and FIG. 15, the element comprises a slice 1 of N-type high resistivity semi-conductor substance having opposed faces 1a and 1b between which extends a peripheral face 1c. Extending over the face 1b of the opposed faces and the peripheral face 1c is a shell region 2 which has been treated to provide a region of P-type low-resistivity which provides, between it and the inner N-type region, a P-N junction 6 the periphery 7 of which lies on the other face 1a of the opposed faces of the slice 1.

Referring now only to the construction shown in FIG. 14, it will be seen that the shell region 2 extends over a peripheral portion 2e thus causing the P-N junction 6 at 6a to extend inwardly of the shell from the peripheral face 2b parallel with and adjacent the face 1a of slice 1 before it emits at its periphery 7 on that face 1a.

The configuration of the limit of the depletion layer in the element is shown by the dotted line 8. It will be seen that the thickness of the depletion layer $a$ in the region of the junction 6 adjacent the face 2c is appreciably less than the extent of the depletion layer $b$ adjacent the periphery 7 of the junction 6.

Referring now only to the construction shown in FIG. 15, it will be seen that there is provided a thickened portion 2f of the shell region 2 adjacent the junction of the peripheral face 2b and the face 2c. Resulting from this thickened portion 2f, that portion 6b of the P-N junction 6 where the junction lies adjacent the peripheral face 2b and before it emits on the face 1a at its periphery 7 extends inwardly of the slice from the peripheral face 2b in close proximity to the face 1a.

In order to understand what is meant by the term "close proximity," there has been added to FIG. 15 in chain lines 9 what would have been the thickness of the depletion layer but for the fact that the portion 6b of the P-N junction 6 was in close proximity to the surface 1a. It will be seen that this theoretical thickness $c$ is greater than the distance of the portion 6b of the junction 6 from the surface 1a.

Resulting from this configuration, the depletion layer is caused to fold back on itself so that the distance which the depletion layer extends over the surface 1a (i.e. $b$) is considerably greater than the depth $a$ of the depletion layer where it is adjacent the mid-portion of the junction 6.

It will be appreciated that there are several methods by which the elements of FIGS. 14 and 15 could be manufactured. For example, the construction of FIG. 14 could be manufactured by masking only the central portion of the face 1a of a lamina of semiconductor material of high resistivity and of one type of conductivity, and subsequently diffusing into the whole of the unmasked area of the slice, material to form the shell region 2.

Alternatively, the element of FIG. 14 could be formed by the method shown in FIG. 16. That is to say, there is firstly formed a lamina or section having the configuration shown in FIG. 16(a) by any one of the methods described above with reference to the constructions shown in FIGS. 5–13.

In this lamina, the shell region 2 extends over only the face 2c of the opposed faces and over the peripheral face 2b; that is, there is formed a slice of the same general configuration as that of the slice illustrated in FIG. 5. Into the peripheral portion 81 (FIG. 16(b)) of the face 1a of the slice thus formed there is diffused material to form the portion 2e of the shell region.

The element of FIG. 15 may be manufactured by the method illustrated in FIGS. 17(a) and (b). By this method there is again formed a slice having a shell region 5 (FIG. 17(a)) extending over only the face 2c of the opposed faces and the peripheral face 2b. Into such a slice there is then diffused in the region of the peripheral portion 2g only (FIG. 16(b)) of the face 2c material to a depth very nearly extending through the thickness of the slice to form the thickened portion 2f of the shell region 2.

As has been explained, in the construction as above described, the depletion layer at the periphery of the junction extends over a greater distance (thus increasing the surface break-down voltage) than was hitherto possible, by virtue of the limited volume into which the depletion layer can expand adjacent the periphery of the junction, being restricted.

To achieve such a construction it is not necessary for the junction to emit on said other of the opposed faces. Indeed, for simplicity of manufacture, it may even be preferable for the junction not so to emit.

An embodiment of the present invention in which the P-N junction does not emit on said other of the opposed faces will now be described with reference to FIG. 18.

The arrangement shown in this FIG. 18 is substantially the same as that shown in FIG. 15, differing only in that in the slice 3 of FIG. 15, the periphery 7 of the P-N junction 6 lies on the upper face 1a of the two opposed faces 1a and 2c of the slice; whereas, in the slice 3 of FIG. 18, the periphery 7 lies on the peripheral face 2b which extends between the opposed faces 1a and 2c.

Other than this difference, in each arrangement the slice 1, of a substance initially all of N-type conductivity and of high resistivity has formed therein a region 2 by the introduction into the slice of a suitable material which converts the substance in that region 2 to P-type conductivity and low resistivity, such that the P-N junction 6 has the configuration shown.

In particular, the P-N junction, in each case, has a second portion 6a which lies in close proximity to the face 1a of the slice and is situated adjacent the periphery 7 of the junction 6.

There is shown in dotted lines 8 and 10 in FIG. 18, what would have been the configuration of the limit of the depletion layer (which would have a depth $a$) were it not for the fact that the portion 6a of the junction 6 was in close proximity to the face 1a. From the dotted line 10, it can be seen that the distance between the junction 6 at the portion 6a and the face 1a is less than would otherwise have been the depth $c$ of the depletion layer adjacent this portion 6a. As a result, the depletion layer is caused to extend over the surface of the slice 3 for a distance $b$ which, again, is greater than the distance (equal to $c$) which the depletion layer would have extended but for the close proximity of the portion 6a of the junction 6 to the face 1a.

This element may have been manufactured by, in one stage, diffusing into or alloying to the face 2c material to form in the slice a region of P-type conductivity and of low resistivity and, either before or after, in another stage, diffusing into the slice 3 material to form the annular portion 2f of the region.

Having thus described our invention what we claim is:

1. A semi-conductor junction element comprising a slice of semi-conductor material having a peripheral side face and first and second opposed end faces;

said slice including a shell region of one type of conductivity and of low resistivity, said shell region including said first end face and at least a portion of said peripheral side face, said shell region containing also a cavity;

said slice including also a core region of the opposite type of conductivity and of high resistivity, said core region being contained at least partially within said cavity and including at least a portion of said second end face;

said core and shell regions defining therebetween a P-N junction having a first mid-portion adjacent said first end face and a second portion adjacent said peripheral side face and said second end face, said P-N junction forming in said core section a depletion layer following generally the configuration of the cavity wall, at least that portion of the depletion layer adjacent said peripheral side surface being formed by diffusion and having an extent ($b$) measured along the surface of the slice between the limit of the depletion layer and the periphery of the junction that is greater than the layer thickness ($a$) at said first mid-portion of the P-N junction, whereby the avalanche voltage across the first midportion of the P-N junction is less than the break-down voltage at the second portion of the P-N junction.

2. A semi-conductor junction element as claimed in claim 1 wherein the free extremity of the second portion of the P-N junction terminates on said second end face and the entire peripheral side face is mounted on said shell portion.

3. A semi-conductor junction element as defined in claim 1 wherein said core portion carries all of said second end face, said second portion of the P-N junction extending successively along the wall of the cavity, and then outwardly toward the peripheral side face in a direction generally parallel with and spaced from the second end face, said P-N junction terminating on said peripheral face.

4. A semi-conductor junction element as defined in claim 2 wherein said shell region includes also at its free end an inwardly directed extension partially enclosing said core region and including a part of said second end face, whereby the second portion of the P-N junction extends in part inwardly from said peripheral side wall between, and in spaced parallel relationship relative to, said second end face and said first portion of the P-N junction.

5. A semi-conductor junction element as claimed in claim 2 wherein said shell portion includes a thickened portion adjacent the junction of the peripheral side wall with the first end face so that the portion of the cavity adjacent the first end face has smaller cross-sectional dimensions than the portion of the cavity adjacent the second end face.

6. A semi-conductor junction element as claimed in claim 2 wherein the cavity side wall is parallel with the peripheral side face of the slice, and further wherein the core region includes a central projecting portion extending beyond said second end face, and an additional layer of material of said one type of conductivity and low resistivity cooperating with the extremity of said central projecting portion to define a second P-N junction.

7. A semi-conductor junction element as claimed in claim 6 wherein there is provided in said central projecting portion an additional P-N junction.

8. A semi-conductor junction element as claimed in claim 6 wherein said central projecting portion has an upper portion and a base portion, the peripheral face of the central projecting portion being undercut so that in cross section the upper portion is wider than the base portion.

References Cited

UNITED STATES PATENTS

| | | |
|---|---|---|
| 2,419,237 | 4/1947 | Treating. |
| 2,794,846 | 6/1957 | Fuller _____ 148—33.2 X |
| 2,975,344 | 3/1961 | Wegener _____ 148—177 X |
| 3,050,667 | 8/1962 | Emeis _____ 148—177 X |
| 3,051,877 | 8/1962 | Maupin _____ 148—177 X |
| 3,094,633 | 6/1963 | Harries _____ 148—33.2 X |
| 3,164,500 | 1/1965 | Benda _____ 148—33.2 X |
| 3,203,840 | 8/1965 | Harris _____ 148—187 |
| 3,226,611 | 12/1965 | Haenichen _____ 148—187 |

HYLAND BIZOT, *Primary Examiner.*